United States Patent [19]
Jones et al.

[11] Patent Number: 5,598,303
[45] Date of Patent: Jan. 28, 1997

[54] METHOD AND APPARATUS FOR SYNCHRONIZING THE ROTATIONS OF DATA STORAGE DISKS IN A PLURALITY OF DISK STORAGE DEVICES

[75] Inventors: J. Wyn Jones, Winchester; Stephen P. Legg, Park Gate; Eric L. Newman, Allbrook, all of England

[73] Assignee: International Business Machines Corporation, Armonk, N.Y.

[21] Appl. No.: 608,992

[22] Filed: Mar. 6, 1996

Related U.S. Application Data

[63] Continuation of Ser. No. 122,272, Sep. 17, 1993, abandoned.

[30]  Foreign Application Priority Data

Sep. 18, 1992 [GB]  United Kingdom ............. 9219762

[51] Int. Cl.⁶ ......................................... G11B 27/19
[52] U.S. Cl. .................... 360/73.02; 360/73.03; 360/73.01
[58] Field of Search ................. 360/48, 73.02, 360/73.03, 73.05, 14.2, 71, 73.01, 69

[56]  References Cited

U.S. PATENT DOCUMENTS

| | | | |
|---|---|---|---|
| 4,618,897 | 10/1986 | Johnson et al. .......................... 360/15 |
| 4,675,864 | 6/1987 | Bliek et al. ....................... 360/73.02 X |
| 4,870,643 | 9/1989 | Bultman et al. ...................... 371/11.1 |
| 4,890,045 | 12/1989 | Ishizuka ............................... 360/73.03 |
| 4,907,105 | 3/1990 | Kurzweil, Jr. ...................... 360/73.02 |
| 4,918,544 | 4/1990 | Ishizuka et al. ................. 360/73.02 X |
| 5,159,503 | 10/1992 | Mibamura et al. ................ 360/73.02 |
| 5,237,466 | 8/1993 | Glaser et al. .................. 360/73.02 X |
| 5,303,097 | 4/1994 | Baba et al. ........................ 360/73.02 |
| 5,416,648 | 5/1995 | Jeppson et al. ..................... 360/73.02 |

FOREIGN PATENT DOCUMENTS

| | | | |
|---|---|---|---|
| 0279912 | 8/1988 | European Pat. Off. ........ G06F 3/06 |
| 320107 | 6/1989 | European Pat. Off. . |
| 0426483 | 5/1991 | European Pat. Off. ....... G11B 19/28 |

*Primary Examiner*—Andrew L. Sniezek
*Assistant Examiner*—Larry T. Cullen
*Attorney, Agent, or Firm*—Roy W. Truelson; Matthew J. Bussan

[57]  ABSTRACT

A synchronization technique is described which finds use in a disk array subsystem comprising a plurality of disk storage devices connected to a controller. In response to signals from each of the devices specifying their angular position at a particular time, the controller calculates the relative angular positions of the devices and issues a signal to each of the devices specifying the amount and direction of change in rotational velocity required to achieve synchronization. In a two device subsystem, the signal to one device will specify a speed decrease and the signal to the second device will specify a speed increase.

4 Claims, 3 Drawing Sheets

METHOD AND APPARATUS FOR SYNCHRONIZING THE ROTATIONS OF DATA STORAGE DISKS IN A PLURALITY OF DISK STORAGE DEVICES

This application is a continuation of application Ser. No. 08/122,272, filed Sep. 17, 1993, now abandoned.

FIELD OF THE INVENTION

This invention relates to the field of data storage systems comprising a plurality of disk drives and more particularly to a technique for synchronizing the rotations of the spindles in two or more of the disk drives.

BACKGROUND OF THE INVENTION

In recent years, there has been a growth in interest in disk drive arrays which comprise a number of disk drives connectable to a using system via one or more controller elements which control the transfer of data to and from the disk drives. A disk array is designed to provide high capacity data storage, high reliability and high data transfer rates to and from the using system.

A number of different array schemes have been proposed. A paper entitled 'A Case for Redundant Arrays of Inexpensive disks (RAID)' (ACM SIGMOD conference proceedings, Chicago, Ill., Jun. 1–3, 1988, pp. 109–116) details five levels of array (RAIDS 1 to 5) which provide different levels of data management. Each of the RAID levels permits users to increase their data storage capacity by linking together a number of inexpensive disk drives. The RAID system provides protection against loss of data through the failure of a drive by either storing two copies of the data on two drives (RAID 1) or by striping the data across two or more drives of the array, calculating the parity for the striped data and storing the parity data on a different drive. In the event that one of the data holding drives fails, it is possible using the parity data and the remaining data of the stripe to reconstruct the data on the failed drive (RAIDs 2 to 5).

It is known that the synchronization of the rotations of the disks in multiple disk drives can have performance advantages in an array of disk drives in which data is striped across the drives of the array. This is because during an operation to read the data, there will be a delay in accessing the data due to rotational latency. In a single disk drive, the average rotational latency is T/2 where T is the period of rotation of the disk. For a disk rotating at 3600 RPM, the average latency is 8.3 ms.

If the disk drives of the array are unsynchronized, the average rotational latency to locate the required data once the head has arrived on the correct track will be N×T/(N+1) where N is the number of disk drives across which the data is spread. For an array of four drives, this average latency is 13 ms, with the figure increasing with the number of drives in the array. If however, the disk drives are synchronized, the average latency is reduced to the figure for a single drive thus improving the performance of the array.

To date, spindle synchronization has been achieved using two main techniques.

In a first technique, one of the disk drives is designated as the master drive and the remaining drives are designated as slave drives. Such a technique is described in U.S. Pat. No. 3,893,178 and U.S. Pat. No. 4,907,105. The master drive is responsible for the synchronization of the slave drives and achieves this by issuing 'synchronization pulses once per revolution to each of the slave drives over a cable interconnecting the master drive and slave drives. The synchronization pulse is used by the slave drives to lock their motors to this timing.

In a second synchronization technique, the disk drives are synchronized to an external signal provided by the controller or other means. Such a technique is described in EP 320 107 where a master controller connected to five disk drives issues a spindle reference signal to each of the drives over a lead. At each drive, the spindle reference signal is compared with a drive index pulse produced every revolution from a mark on the disk and based on this comparison the disk drive determines whether the disk motor should be slowed down or speeded up to achieve synchronization of the reference signal and the index pulse. The second technique has the advantage over the first technique in that there is no master drive/slave drive relationship and, therefore, synchronization is not lost in the event of failure of the master drive should fail.

One disadvantage of prior systems employing the second technique arises when the index pulses from all the drives to be synchronized either lag or lead the reference signal. The time required to lock the index pulses of all drives to the reference signal can be significant especially when the index pulses are close to 180 degrees out of phase with respect to the reference signal. This leads to a delay in beginning read/write operations to the synchronized drives.

SUMMARY OF THE INVENTION

The present invention seeks to overcome this disadvantage of the second synchronization technique while avoiding the disadvantage of the first technique. Accordingly there is provided, in one aspect of the invention, a data storage system comprising:

a plurality of disk storage devices, each device having at least one rotatable data storage disk;

a controller in communication with the plurality of storage devices; characterized in that:

the controller includes means responsive to a position-indicating signal from each of two or more of the plurality of storage devices indicative of the rotational angular position of the disk in each device at a particular time to calculate the relative angular displacements of the disks in said two or more devices, the controller further including means to issue a correction signal to each of the devices indicating the change in angular position of the disk required to synchronize the rotations of the disks in said two or more devices, each of the disk devices including means responsive to the correction signal to effect a temporary change in rotational velocity of the disk to cause the required change in angular position.

In this way, the controller is able to calculate the relative angular displacements of the devices that are to be synchronized and is therefore able to calculate the most time efficient way of synchronizing the rotations of the devices. The controller calculates the phase relationship between the disk storage devices and supplies a correction signal to the drives to synchronize the rotations of the drives. Regular repetition of the synchronizing procedure will ensure that the positional phase relationship of the devices is maintained.

Although in most prior art synchronization techniques, the term 'synchronization is used to denote in-phase synchronization, synchronization as used in the present invention has the broader meaning of setting of a positional phase relationship between storage devices and maintaining the relative position during read/write operations.

In one type of data storage system according to the present invention, the devices are initiators of the synchronization procedure. At periodic intervals, each device might issue a signal to the controller indicating the rotational position of the disk(s) in that device at a particular time. Based on a knowledge of the time of receipt of the signals from each of the devices, the controller could then calculate the relative angular displacements of the devices and then issue a correcting signal to each of the devices to achieve synchronization. In one such system, each device might issue the index pulses generated from index marks on the disks directly to the controller which could then calculate the phase difference between the pulses and issue the optimum correcting signal.

However, in a preferred system, the controller initiates the synchronization process as and when required (e.g., on command from the attached host system) by issuing a synchronization signal to the devices which causes the devices to send the position indicating signal to the controller.

The technique of the present invention may be used to achieve a variety of different synchronization configurations. In a first configuration, the synchronized devices are locked in phase with one another. Alternatively, a pair of devices may be locked in antiphase (mirroring). This is a useful technique for a system in which two disks contain the same data and has the effect of reducing the rotational latency. In addition, the angular positions of an array of devices may be staggered with respect to one another. This finds use in achieving rapid access to sequential data spread across the array of devices.

In another aspect of the invention, there is provided a method for synchronizing the angular positions of data storage disks in different disk storage devices, the devices being connected for communication with a device controller, the method comprising the steps of: transmitting from each device to the controller a position-indicating signal indicative of the rotational angular position of the disk in each device at a particular time; in response to the position indicating signal, determining in the controller the relative angular position of the disks in each device and based on this determination calculating for each disk the change in angular position required to synchronize the angular positions of the disks; and issuing a correction signal from the controller to each of the devices to cause each device to effect a temporary change in rotational velocity of the disk to cause the required change in angular position.

BRIEF DESCRIPTION OF THE DRAWINGS

A preferred embodiment of the invention will now be described, by way of example only, with reference to the accompanying drawings in which.

DETAILED DESCRIPTION OF THE PREFERRED EMBODIMENT

Figure 1:
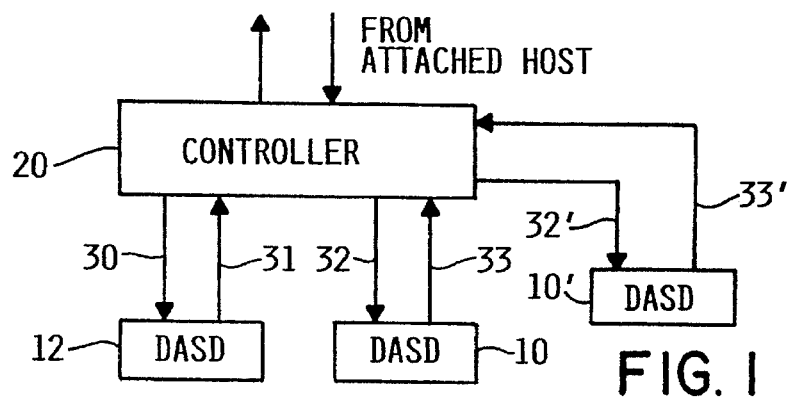
FIG. 1 shows a data storage system including controller attached to a pair of disk drives.

FIG. 1 shows a data storage system including two disk drives 10, 12 connected via two full duplex serial links 30, 31; 32, 33 to a disk drive controller 20. (Additional disk drives, such as disk drive 10', may be respectively connected via a full duplex serial link 32', 33' to the disk drive controller 20.) The controller is in turn attached to a host system (not shown) from which it receives commands and data. The controller acts on these commands to issue order to the attached disk drives to control the transfer of data between the disk drives and the host. In the following description, the synchronization technique of the present invention will be discussed in relation to a pair of disk drives but it will be appreciated that the technique is readily extendable to a larger number of drives.

Figure 2:
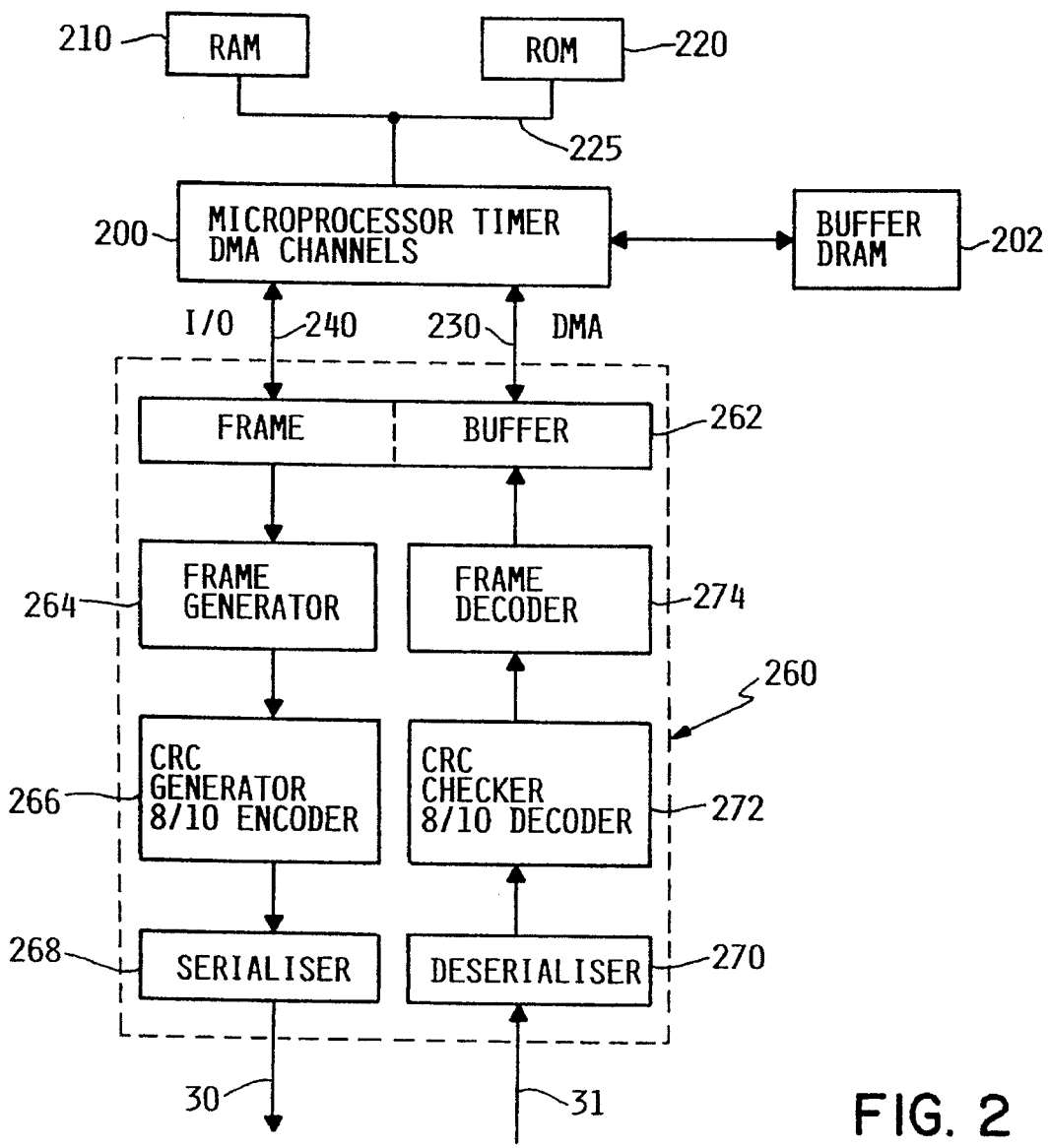
FIG. 2 shows, in block diagrammatical form, the main functional components of the controller of FIG. 1.

Referring now to FIG. 2, there is shown in block diagrammatical form, the main components of the controller. Microprocessor chip 200 performs the functions of DMA controller and also a general system controller, operating in this latter respect under the control of program code stored in ROM 220 and RAM 210, both of which are connected to the microprocessor via bus 225. The microprocessor is also connected to a relatively large DRAM buffer 202 which is used primarily as a temporary staging post for read/write data being transferred between host and disk drives. The controller microprocessor is further connected by means of a DMA bus 230 and an I/O bus 240 to a controller link chip (CLC) 260. The DMA bus caries the read/write data between the DRAM buffer and the CLC. The CLC controls the operation of the serial links over which disk drive and controller communicate. Each serial link comprises an inbound link 31 and an outbound link 30. For reasons of clarity, only one serial link connecting the controller to DASD 12 is shown in FIG. 2. It will be appreciated that another similar serial link (comprising inbound and outbound portions) connects the controller via a second CLC to disk drive 10.

The CLC 260 of FIG. 2 comprises a frame buffer 262 which is common to both inbound and outbound sides of the link. The outbound portion of the CLC comprises frame generator 264 connected to CRC generator and 8/10 encoder 266 which is in turn connected to serializer 268. Frames are the primary means employed to transfer information over a serial link and will be described in greater detail below. The inbound portion of the CLC comprises deserializer 270 which is connected to 8/10 decoder and CRC checker 272 which is in turn connected to frame decoder 274.

Figure 3:
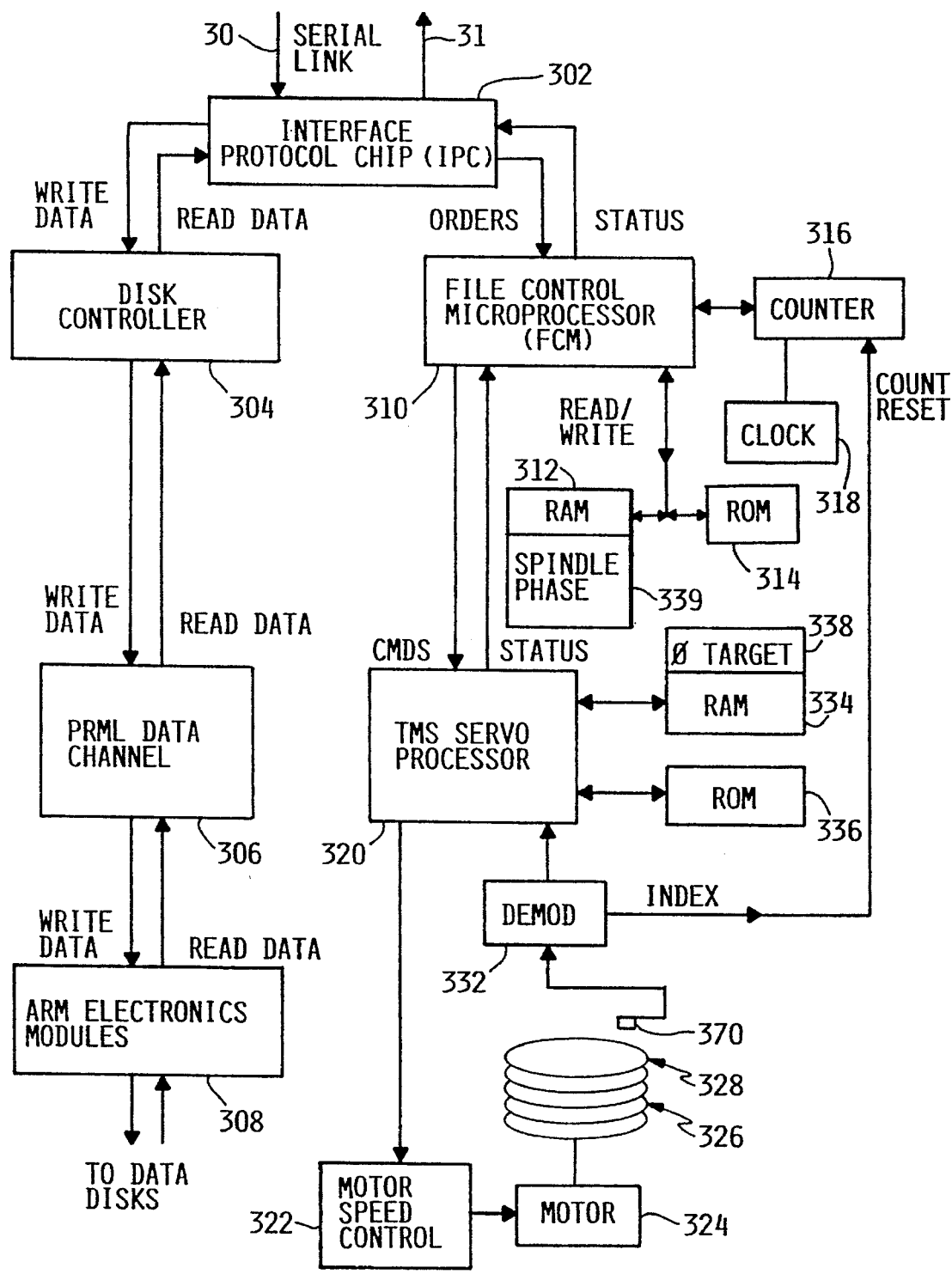
FIG. 3 shows, in block diagrammatical form, the main functional components of the disk drive of FIG. 1.

Referring now to FIG. 3, there is shown in block diagrammatical form, the major functional components of the disk drive electronics. The inbound and outbound serial links from the controller attach to the drive via an Interface Protocol Chip (IPC) 302. In broad terms, the IPC is the counterpart to the CLC in that the inbound portion includes a deserializer, CRC checker, 8/10 decoder and frame decoder. The outbound portion includes a frame generator, CRC generator, 8/10 encoder and serializer. Data to be read to the disks is routed via the disk controller 304, PRML data channel 306 and arm electronics modules 308.

Disk Drive orders received over the serial link from the controller are decoded by the IPC and routed to a File Control Microprocessor (FCM) 310. The FCM operates under the control of program code which is stored in RAM 312 and ROM 314. Also associated with the FCM is a counter 316 and a clock 318 which are used in the synchronization technique as will be described below.

The disk drive electronics also include a TMS Servo Processor 320 that performs the servo control functions. The TMS Processor is connected to motor speed control logic 322 which controls the speed of the motor which drives the data disks 326 and servo disk 328. Servo information on disk 328 is read by servo head 370 and directed to demodulator 332. Demodulated servo information is used by the TMS Processor to control the speed of the disks. Associated with the TMS Processor are RAM 334 and ROM 336. RAM 334 includes an area 338 in which a target phase value is stored. This target phase value is supplied to the RAM by the controller.

Having described the major functional components of the controller and disk drive, it is necessary at this stage to describe those features of the serial link communication protocol which are useful in understanding the remainder of the description.

Figure 4:
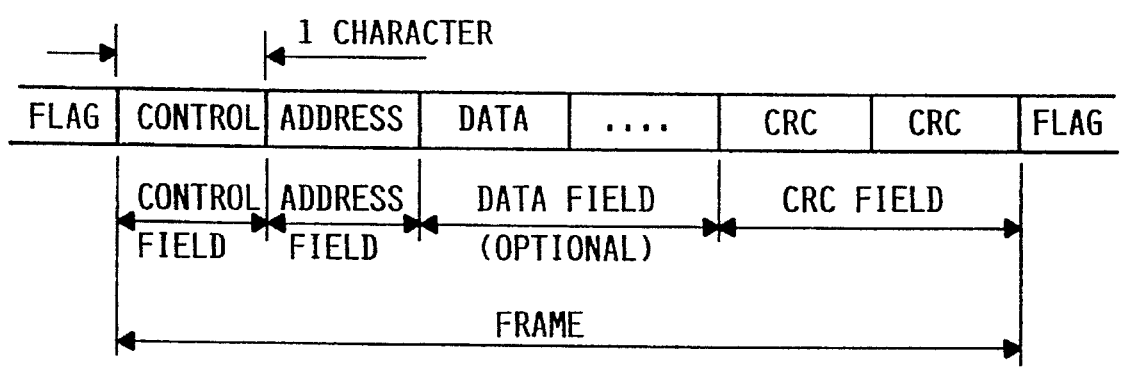
FIG. 4 shows the format of a frame employed in communication between controller and disk drives.

Information is transferred over the serial link between the disk drives and controller in the form of frames. The format of a frame is shown in FIG. 4 and consists of a sequence of three or four fields namely control field, address field, data field (optional) and a CRC field. Flags at the beginning and end of a frame are employed to separate one frame from another.

There are two basic types of frame namely Control frame and Application frame. Control frames are typically used to, e.g., recover from link errors and to abort link orders. Control frames are employed in the synchronization technique described below. A Control frame is distinguished from an Application frame in that the most significant six bits of the control field have a non-zero value.

An Application frame has all zeroes in the most significant six bits of the control field and is thus distinguished from a Control frame. There are two main types of Application frame namely Message frames and Data frames. The address field in an Application frame specifies the destination address of the frame.

Message frames are used to communicate between the microprocessors in the controller and the disk drive, e.g., to send orders to the disk drive and to receive status back from the drive. The format of a message frame is essentially the same as the frame format shown in FIG. 4, but in a message frame, the data field contains a message. The first byte of the data field is a code which identifies the function required and the length of the message field is variable depending on the particular message. The various disk drive orders (e.g., READ, WRITE, etc.) are sent from the controller as messages in a message frame. Each of these orders is fully contained in a single frame.

Data frames are used to transfer data (i.e., read/write data) between the controller and the disk drive. The length of the data field is variable and a single data transfer will typically require multiple data frames.

When the controller is in communication with a disk drive, the required type of frame (control, message or data) is generated in the Controller link Chip frame generator 264 under the control of the microprocessor 200. The CRC is generated and included in the frame, the frame is encoded and then driven over the outbound serial link to the attached disk drive. The IPC interprets the frames received over the link from the controller in order to determine whether the frame is a Message, Data or Control frame. For a message or data frame, the IPC routes the frame to the destination specified in the address field. A control frame which is distinguished by the value of the most significant six bits in the control field is routed to FCM 310.

Next will be described, with reference to FIG. 3, the technique by which the speed of the spindle motor is controlled using the phase detection logic. There are a number of different ways of controlling disk speed known in the prior art, and it should be noted that the precise technique is not critical to the disk synchronization technique used in the present invention.

During operation of the disk drive, servo information is read from the dedicated servo disk 328 by the servo head 370 and servo pulses are generated by the demodulator 332. These pulses are compared against bit pulses from a crystal oscillator in comparator logic (not shown). In a manner well known in the art, comparator logic calculates the phase difference between the oscillator pulses and the servo pulses. The value of phase is compared to the target phase 338 and the resulting phase error is acted on by the motor servo control algorithm in a manner also well known in the art to cause a temporary adjustment to the spindle motor drive, thereby to reduce the phase error between the detected phase difference and the phase target. For more detail of the phase detection logic, further reference should be made to an IBM Technical Disclosure Bulletin (Vol. 32 No. 58 October 1989 pp 322–324) entitled 'Phase error detect logic for disk file speed control.' This process can be repeated at regular predefined intervals to keep the phase error between the crystal and the spindle motor to within predetermined limits.

The spindle motor drive will be changed in progressive steps in order that the speed of the motor does not vary outside predetermined limits (e.g., 0.01%) during read or write operations.

The operation of the synchronization technique will now be described.

The FCM Hardware counter 316 is reset once per revolution of the disk at INDEX, and counts up at a fixed rate under the control of a high frequency clock (e.g., 20 MHz). The FCM counter will normally operate even when disk synchronization is not required though it would be possible to only activate the counter immediately prior to the initiation of disk synchronization operations.

The controller initiates synchronization by sending a control frame over the serial link to the drives to be synchronized. It may be feasible to issue a control frame to the drives simultaneously though it is more likely that the frames will be issued at different times, albeit only separated by a short time period. If not simultaneous, the controller will need to keep a record of the difference in the times at which the frames are issued. A predefined bit (sync bit) of the control field in each control frame is set to 1 which defines the frame as a sync frame. Receipt and identification of the sync frame at the disk drive causes an interrupt in the FCM which freezes the FCM hardware counter. The frozen value of the counter indicates the elapsed time from the detection of the most recent INDEX pulse to the receipt of the control frame and thus provides a snapshot of the angular position of the disk at the time the sync frame is received. The contents of the counter are read by the File Control Microprocessor and multiplied by a constant to generate consistent units for the controller (e.g., 100 ns). The FCM then stores the result in its RAM address space, in the location spindle phase 339.

At some later time, the controller issues a message frame to each of the disk drives specifying an order to read the FCM RAM (READ RAM order). The value of the spindle phase counter stored in RAM is read and a status message frame generated by the IPC which includes the value of the counter. Receipt of the READ RAM order at the disk drive causes the counter to reset. In an alternative technique, the counter is interrogated directly by a read position order issued by the controller with receipt of the read position order causing the counter to reset.

The controller receives the status message frame from each of the addressed disk drives over the serial link. The frames are identified as status frames and the microprocessor extracts the spindle phase counter values contained in the frames and stores them in RAM. The controller microprocessor, under control of a particular task defined by the program code, then determines the relative angular positions of the drives from the received counter values. Depending on the synchronization configuration required, the microprocessor calculates the spindle 'error' in angular position from the average value of the two spindle phase counters and causes the CLC to generate a control frame to be issued to each disk drive. The units of the position error contained within the control frame are the same as those of the counter values sent to the controller (100 ns).

For the simple case where it is desired to lock the phases of the two drives, the controller calculates the average of the two spindle phase values and issues an order to each drive specifying the spindle error of each drive from the average value. This position error value represents the change in angular position which is required to achieve phase synchronization. It is a simple matter to factor into the spindle error calculation any difference in the times at which the sync frames were issued to the disk drives.

It will be appreciated that the technique is readily extendable to the synchronization of three or more disk drives. Instead of calculating the average of all the received spindle phases, the controller calculates the average of the maximum and minimum spindle phases and determines the spindle error of each drive from this average.

This spindle error value received by each drive is processed by the IPC and the FCM extracts the value and multiplies it to restore it to its internal units. The FCM then causes the TMS processor to write a target phase value (in the internal units) to a specified portion of the TMS RAM. This target phase value 338 is then used by the spindle motor servo control algorithm in order to calculate the desired change in motor drive.

The spindle motor servo algorithm operates to drive the difference between the spindle error and the target phase to zero. The means by which this is done are well described in the art.

What is claimed is:

1. A data storage system comprising:
   a plurality of disk storage devices, each device having at least one ratatable data storage disk;
   a controller in communication with the plurality of storage devices, said controller comprising:
   (a) calculating means, responsive to a position-indicating signal, from each of two or more of the plurality of storage devices, indicative of the rotationl angular position of the disk in each device at a particular time, for calculating the relative angular displacements of the disks in said two or more devices,
   (b) means, responsive to the calculated relative angular displacements of the disks in said two or more devices, for issusing a correction signal to each of the devices indicating a change in angular position of the disk required to synchronize the rotations of the disks is said two or more devices, each of the disk devices including means, responsive to the correction signal, for effecting a temporary change in rotational velocity of the disk to cause the required change in angular position, and
   (c) means for issusing a synchronization signal to each of said two or more devices; each of the disk devices including means, responsive to the synchronization signal, for issusing said position-indicating signals;
   wherein each disk storage device further comprises:
   means for detecting a disk index mark during rotation of the disk and for producing an index pulse; and
   a counter responsive to said index pulse for measuring the elapsed time from said pulse to provide an indication of an angular displacement of said disk from said index mark, the counter resetting on receipt of said index pulse;
   wherein the synchronization signal from the controller causes the counter to freeze and the position-indicating signal issued by the device indicates the frozen value of the counter.

2. A system as claimed in claim 1, comprising two disk storage devices, wherein when the calculating means calculates that the position-indicating signal received from the first device is less than that received from the second device, the correction signal issued to the first device specifies a required velocity increase and the correction signal issued to the second device specifies a required velocity decrease.

3. A system as claimed in claim 1, comprising three or more disk storage devices, wherein the calculating means calculates the average of a maximum and a minimum of the position-indicating values received from the devices and based on the calculated average determines the required change in rotational velocity for each of the devices.

4. A system as claimed in claim 1, wherein the controller is connected to each of the plurality of data storage devices by a dedicated serial link over which data is transferred between the controller and the device, and wherein the position-indicating signal and the correction signal are transferred over the same dedicated serial link.

* * * * *

UNITED STATES PATENT AND TRADEMARK OFFICE
CERTIFICATE OF CORRECTION

PATENT NO. : 5,598,303
DATED : January 28, 1997
INVENTOR(S) : J. Wyn Jones, et al It is certified that error appears in the above-identified patent and that said Letters Patent is hereby corrected as shown below:

Claim 1, Col. 7, Line 47, "ratatable" should be --rotatable--.

Claim 1, Col. 7, Line 52, "rotationl" should be --rotational--.

Claim 1, Col. 8, Line 9, "," should be --;--.

Signed and Sealed this

Twenty-seventh Day of May, 1997

Attest:

BRUCE LEHMAN

Attesting Officer

Commissioner of Patents and Trademarks